(12) United States Patent
Sze

(10) Patent No.: US 9,630,671 B1
(45) Date of Patent: Apr. 25, 2017

(54) CONNECTOR FOR CHIN-STRAP ASSEMBLY OF HELMET

(71) Applicant: Benjamin Sze, Richmond Hill (CA)

(72) Inventor: Benjamin Sze, Richmond Hill (CA)

(*) Notice: Subject to any disclaimer, the term of this patent is extended or adjusted under 35 U.S.C. 154(b) by 0 days.

(21) Appl. No.: 15/074,607

(22) Filed: Mar. 18, 2016

(51) Int. Cl.
*B62J 11/00* (2006.01)
*A42B 3/00* (2006.01)
*A42B 3/08* (2006.01)

(52) U.S. Cl.
CPC ............ *B62J 11/005* (2013.01); *A42B 3/006* (2013.01); *A42B 3/08* (2013.01); *A42B 3/00* (2013.01); *Y10T 70/5013* (2015.04)

(58) Field of Classification Search
CPC ...... B62J 11/005; A42B 3/0413; A42B 3/006; Y10T 70/5013
USPC .......................................... 224/413, 572, 264
See application file for complete search history.

(56) References Cited

U.S. PATENT DOCUMENTS

| | | | |
|---|---|---|---|
| 3,399,855 A * | 9/1968 | Shirai .................. | A42B 3/0413 224/413 |
| 3,531,955 A * | 10/1970 | Fischer .................. | B62J 11/005 2/422 |
| 3,779,597 A * | 12/1973 | Uchida .................. | B62J 11/005 211/4 |
| 3,798,934 A * | 3/1974 | Wright .................. | A42B 3/0413 119/795 |
| 4,438,877 A | 3/1984 | Jackson | |
| 4,733,805 A | 3/1988 | Sawada | |
| 4,754,858 A * | 7/1988 | Robinson .............. | A45C 13/26 16/411 |
| 4,895,284 A | 1/1990 | Nogami et al. | |
| 4,903,349 A | 2/1990 | Arai | |
| 5,088,633 A * | 2/1992 | Cunard .................. | B62J 11/005 224/418 |
| 5,119,910 A * | 6/1992 | Heggeland ............. | A45C 13/22 150/108 |
| 5,292,044 A * | 3/1994 | Reimers .................. | A45F 3/12 224/257 |
| 5,531,364 A | 7/1996 | Buis | |
| 5,551,614 A * | 9/1996 | Ham ........................ | A45F 3/12 2/268 |
| 5,809,578 A * | 9/1998 | Williams ................. | A42B 3/08 2/421 |
| 6,116,064 A | 9/2000 | Driscoll | |
| 6,354,476 B1 | 3/2002 | Alderman | |

(Continued)

FOREIGN PATENT DOCUMENTS

DE 3035246 A1 * 9/1982 ............... B62H 5/00
FR 2351850 A1 * 12/1977 ........... A42B 3/0413
(Continued)

OTHER PUBLICATIONS

"Helmet Bra", retrieved from http-Ighttp.26404.nexcesscdn. net80B717aerostichmediacatalogproductcache1image960x040ec09 b1e35df139433887a97daa66f161601__1ha on Mar. 18, 2016.
(Continued)

*Primary Examiner* — Justin Larson
(74) *Attorney, Agent, or Firm* — Ridout & Maybee LLP

(57) ABSTRACT

An apparatus includes a connector assembly configured to selectively connect with a chin-strap assembly of a motorcycle helmet. The connector assembly is also configured to selectively connect with a motorcycle device of a motorcycle.

14 Claims, 6 Drawing Sheets

(56) References Cited

U.S. PATENT DOCUMENTS

| | | | | |
|---|---|---|---|---|
| 6,783,040 | B2* | 8/2004 | Batchelor | B62J 9/008 224/406 |
| 7,028,800 | B2* | 4/2006 | Yagisawa | B62J 1/12 180/219 |
| 7,866,431 | B2 | 1/2011 | Ito | |
| 8,087,270 | B1 | 1/2012 | Gruver et al. | |
| 8,701,954 | B1* | 4/2014 | Weinmeister | B60R 7/10 206/8 |
| 2002/0008125 | A1* | 1/2002 | Caputi | A45C 13/30 224/257 |
| 2004/0118888 | A1 | 6/2004 | Russell | |
| 2004/0262350 | A1* | 12/2004 | Batchelor | B62J 9/008 224/413 |
| 2007/0261212 | A1 | 11/2007 | Russell | |
| 2010/0084446 | A1 | 4/2010 | Skillern et al. | |
| 2012/0048900 | A1* | 3/2012 | Wong | A45C 3/001 224/257 |
| 2012/0261446 | A1* | 10/2012 | Stegmeyer | A45F 3/12 224/264 |
| 2014/0076948 | A1 | 3/2014 | Tsutsui et al. | |

FOREIGN PATENT DOCUMENTS

| | | | | |
|---|---|---|---|---|
| FR | 2370622 | | 6/1978 | |
| IT | FR 2639312 | A3 * | 5/1990 | B62H 5/003 |
| JP | 04342682 | | 11/1992 | |
| NL | 7407054 | | 12/1975 | |

OTHER PUBLICATIONS

"Helmet Brazier", retrieved from http-www.bikernet.comnewsimagesPhotoID25087.jpg on Mar. 18, 2016.

"Helmet Connection", retrieved from https-www.google.casearchq=helmet+lock+strap&safe=off&client=safari&hl=en-ca&prmd=ivsn&source=lnms&tbm=isch&sa=X&ved=0ahUKEwjjgP on Mar. 18, 2016.

"Helmet Connector (connecting helmet to interior buckle of motorcycle)", retrieved from http-ridecbr.comforumstopichow-to-diy-helmet-locks-for-your-cbr on Mar. 18, 2016.

"Helmet Coupler (for connecting helmet to interior buckle located under seat)", retrieved from http-www.kawasakimotorcycle.orgforumkawasaki-streetbikes-sportbikes113267-ninja-250-helmet-lock.html on Mar. 18, 2016.

"Helmet Cover", retrieved from http-lockitt.commm5graphics000000o1oxford-lidlasher__323x350.jpg on Mar. 18, 2016.

"Helmet Netting System", retrieved from http-www.mcmotoparts.comebaybungee-cordfk-502-ypmotorcycle-bungee-cord-cargo-net-install.jpg on Mar. 18, 2016.

"Helmet Netting", retrieved from http-www.dhresource.com0x0sf2-albu-g2-M01-92-B7-rBVaGIXqkQOADBoPAAFtDquyhK8940.jpgmotorcycle-helmet-luggage-rope-bungee-cord on Mar. 18, 2016.

* cited by examiner

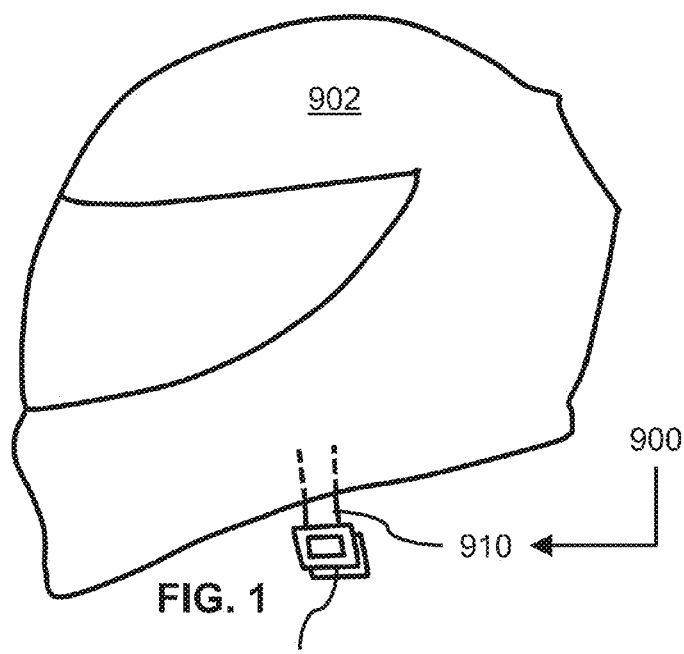
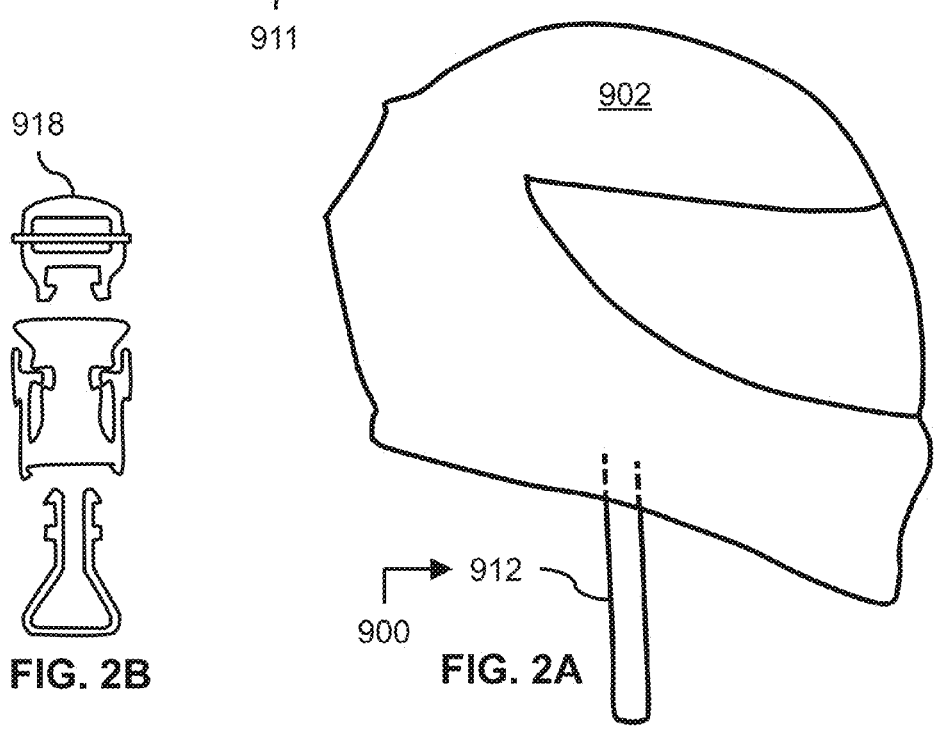

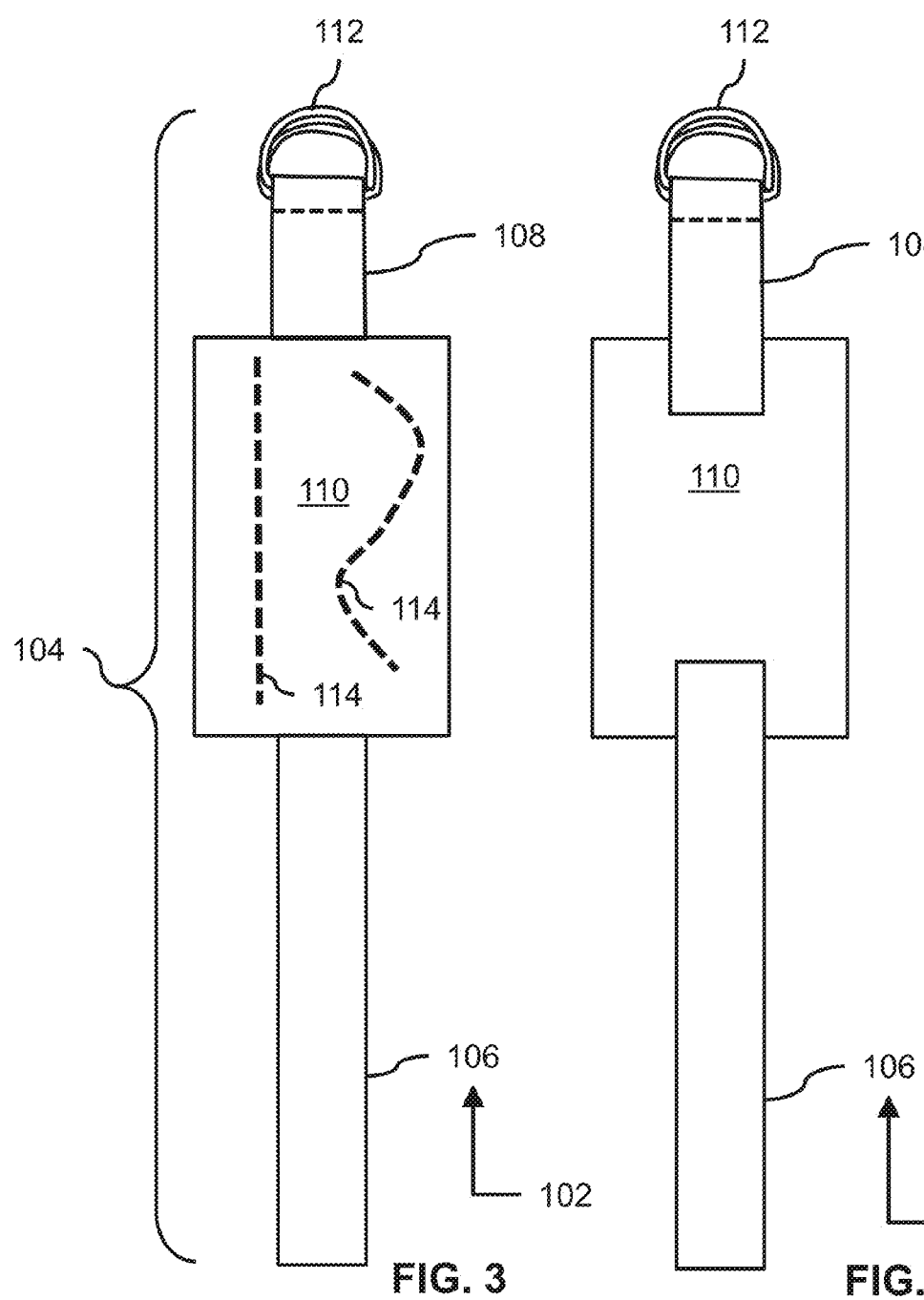

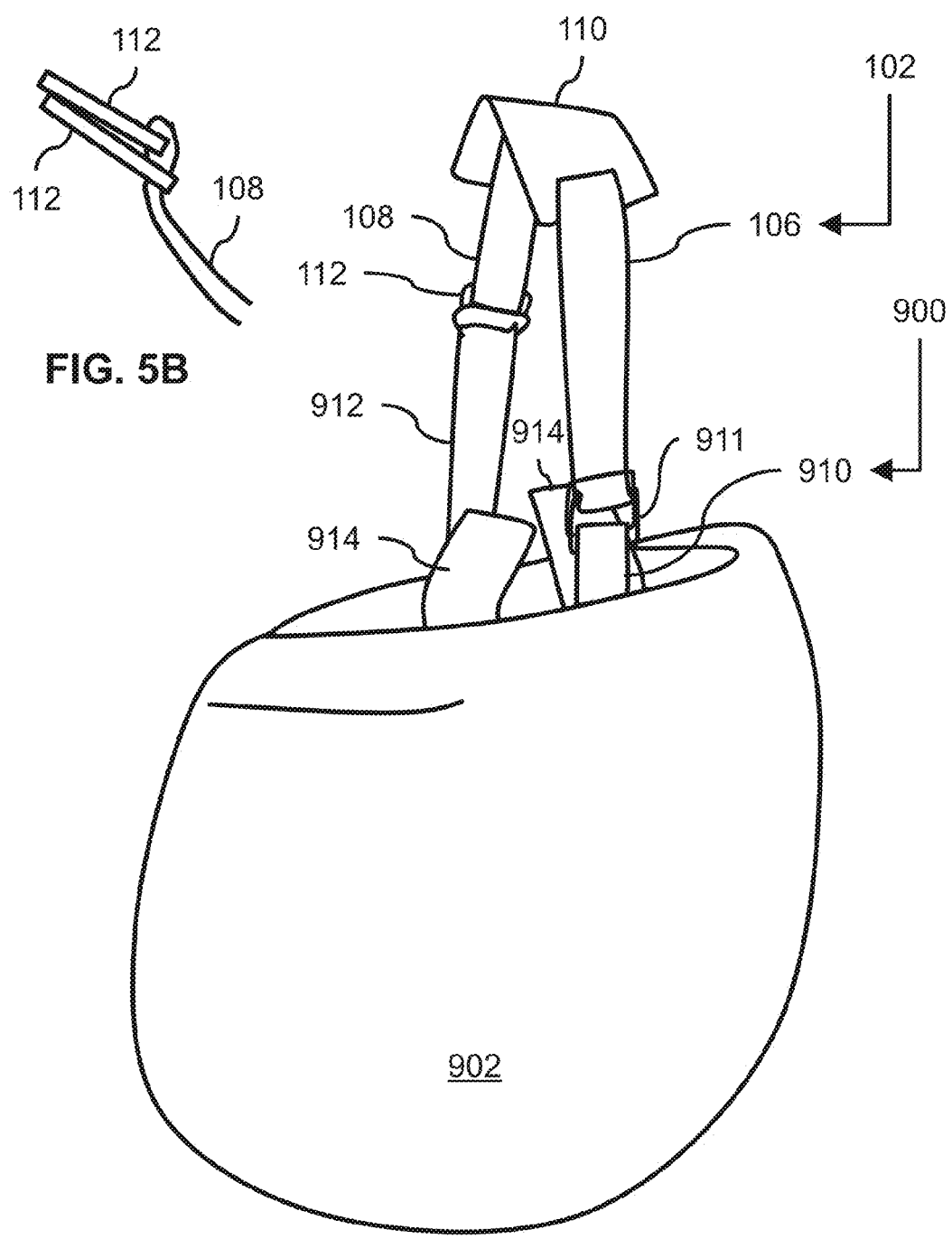

CONNECTOR FOR CHIN-STRAP ASSEMBLY OF HELMET

TECHNICAL FIELD

This document relates to the technical field of (and is not limited to) an apparatus including a connector assembly configured to selectively connect (either directly or indirectly) with a chin-strap assembly of a motorcycle helmet, and with a motorcycle device of a motorcycle.

BACKGROUND

A motorcycle helmet is a type of helmet (protective headgear) used by motorcycle riders. A motorcycle helmet provides protection for the rider's head during impact, thus preventing or reducing head injury and saving the rider's life. Some helmets provide additional conveniences, such as ventilation, face shields, ear protection, intercom, etc. Helmets are secured by a chin strap, and their protective benefits are greatly reduced, if not entirely eliminated, if the chin strap is not securely fastened so as to maintain a snug fit.

SUMMARY

It will be appreciated that there exists a need to mitigate (at least in part) at least one problem associated with the existing motorcycle helmets (also called the existing technology). After much study of the known systems and methods with experimentation, an understanding of the problem and its solution has been identified and is articulated as follows:

Sometimes, a rider needs to transport a spare helmet on their motorcycle. For instance, a net assembly (netting) or a helmet bra is a device for connecting the motorcycle helmet to the motorcycle. While these connecting devices appear to provide some benefit, they are not compact or easily stored when not utilized, and may inconveniently require different device configurations for different types of helmets.

What is needed is an apparatus that is configured to selectively connect (either directly or indirectly) with a chin-strap assembly of a motorcycle helmet, and a motorcycle device of a motorcycle.

To mitigate, at least in part, at least one problem associated with the existing technology, there is provided (in accordance with a major aspect) an apparatus. The apparatus includes a connector assembly. The connector assembly is configured to selectively connect (either directly or indirectly) with a chin-strap assembly of a motorcycle helmet. The connector assembly is also configured to selectively connect (either directly or indirectly) with a motorcycle device of a motorcycle. This is done in such a way that the motorcycle helmet is connectable to the motorcycle device once the connector assembly connects with the chin-strap assembly and with the motorcycle device. An advantage of the apparatus is that the motorcycle helmet is securely transportable by the motorcycle (once the connector assembly attaches the motorcycle helmet to the motorcycle).

The apparatus may be configured to be more easily used with different types or models of the motorcycle helmet. As well, the apparatus may be configured to be compact or easily stored when not utilized.

Other aspects are identified in the claims.

Other aspects and features of the non-limiting embodiments may now become apparent to those skilled in the art upon review of the following detailed description of the non-limiting embodiments with the accompanying drawings.

This Summary is provided to introduce concepts in simplified form that are further described below in the Detailed Description. This Summary is not intended to identify key features or essential features of the disclosed or claimed subject matter, and is not intended to describe each disclosed embodiment or every implementation of the disclosed or claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 1, FIG. 2A and FIG. 2B (SHEET 1 of 6) depict side views of embodiments of a motorcycle helmet for use with a motorcycle;

FIG. 3 and FIG. 4 (SHEET 2 of 6) depict a top side and a bottom side (respectively) of an apparatus including a connector assembly for use with a chin-strap assembly of the motorcycle helmet of FIG. 1;

FIG. 5A and FIG. 5B (SHEET 3 of 6) depict perspective views of an embodiment of the apparatus of FIG. 3 that is coupled to the motorcycle helmet of FIG. 1;

Figures 6A, 6B:
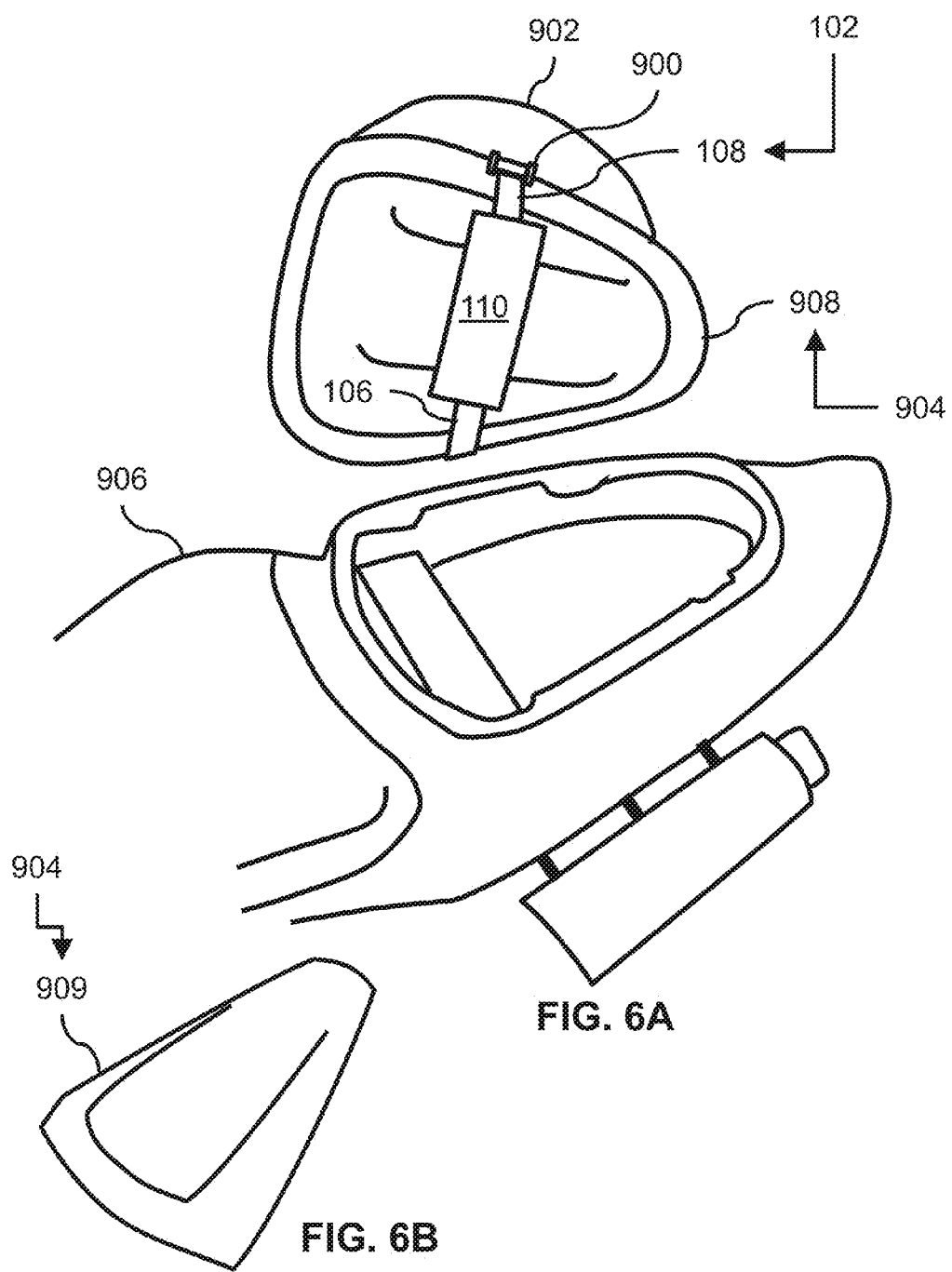
FIG. 6A and FIG. 6B (SHEET 4 of 6) depict perspective views of an embodiment of the apparatus of FIG. 3 that is coupled to the motorcycle helmet and is also coupled to a motorcycle device of the motorcycle.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 102 connector assembly
104 elongated strap assembly 106 first end portion
108 second end portion
110 central portion
112 buckle assembly
114 grip device
116 connection device
118 cable lock device
900 chin-strap assembly
902 motorcycle helmet
904 motorcycle device
906 motorcycle
908 motorcycle seat
909 fairing seat cover
910 first chin-strap portion
911 chin-strap connector
912 second chin-strap portion
914 chin-guard assembly
916 rear compartment
918 chin-strap extension

DETAILED DESCRIPTION OF THE
NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. The implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1, FIG. 2A and FIG. 2B depict side views of embodiments of a motorcycle helmet 902 for use with a motorcycle 906. A motorcycle 906 is defined as a two-wheeled vehicle or a three-wheeled vehicle (motorized or not motorized), and may include a motor scooter, etc.

The motorcycle helmet 902 includes a chin-strap assembly 900. The chin-strap assembly 900 has (includes) a first chin-strap portion 910 and a second chin-strap portion 912 spaced apart from the first chin-strap portion 910. The motorcycle helmet 902 may include a full-face helmet, a ¾ helmet, a half helmet, etc.

Referring to the embodiment as depicted in FIG. 2B, in accordance with an embodiment, the motorcycle helmet 902 (such as a full-face helmet) has a relatively short length of the chin-strap assembly 900. For some riders, a chin-strap extension 918 (also called a chin-strap accessory) may be purchased separately and installed to the chin-strap assembly 900 (if so desired). For this case, the chin-strap assembly 900 includes (and is not limited to) a chin-strap extension 918. The chin-strap extension 918 may include a quick-release buckle (known, not depicted and not described). An embodiment of the chin-strap extension 918 includes the ECHO Model 0108-001 Quick Release Chin-Strap (as depicted in FIG. 2B).

The first chin-strap portion 910 may be called the buckle strap. Preferably, the first chin-strap portion 910 includes a chin-strap connector 911 (such as, a set of rings or a set of D-rings, etc., and any equivalent thereof). Once the motorcycle helmet 902 is worn on the head of the user and the chin-strap assembly 900 is positioned around the chin of the user, the second chin-strap portion 912 (also called a male portion) is configured to be securely connected with the first chin-strap portion 910 (also called a female portion). This is done in such a way that the chin-strap assembly 900 secures the motorcycle helmet 902 to the head of the rider (user).

FIG. 3 and FIG. 4 depict a top side and a bottom side (respectively) of an apparatus including a connector assembly 102 for use with a chin-strap assembly 900 of the motorcycle helmet 902 (as depicted in FIG. 1, FIG. 2A and FIG. 2B), or for use with the combination of the chin-strap assembly 900 and the chin-strap extension 918.

The connector assembly 102 is depicted as being placed on (positioned on) a flat surface. Preferably, the connector assembly 102 includes a flexible material configured to flex and conform (at least in part) with a surface.

Referring to the embodiments as depicted in FIG. 3 and FIG. 4, the connector assembly 102 is configured to selectively connect (either directly or indirectly) with the chin-strap assembly 900 of the motorcycle helmet 902 (or the combination of the chin-strap assembly 900 and the chin-strap extension 918). The connector assembly 102 is also configured to selectively connect (either directly or indirectly) with the motorcycle device 904 of a motorcycle 906 (as depicted in FIGS. 6 to 9). This is done in such a way that the motorcycle helmet 902 is connectable to the motorcycle device 904 once the connector assembly 102 connects with the chin-strap assembly 900 and with the motorcycle device 904. An advantage of the apparatus is that the motorcycle helmet 902 is securely transportable by the motorcycle 906 (once the connector assembly 102 attaches the motorcycle helmet 902 to the motorcycle 906).

In accordance with an option, the chin-strap assembly 900 includes the chin-strap extension 918 (as depicted in FIG. 2B), and the connector assembly 102 is configured to selectively connect (either directly or indirectly) with a combination of the chin-strap extension 918 and the chin-strap assembly 900.

Referring to the embodiments as depicted in FIG. 3 and FIG. 4, the connector assembly 102 is also configured to selectively connect (either directly or indirectly) with the chin-strap assembly 900 without adversely interfering with any one of the chin-strap assembly 900 and the motorcycle helmet 902. The connector assembly 102 is also configured to selectively connect (either directly or indirectly) with the motorcycle device 904 without adversely interfering with any one of the motorcycle device 904 and the motorcycle 906.

Referring to the embodiments as depicted in FIG. 3 and FIG. 4, the connector assembly 102 is also configured to selectively disconnect (either directly or indirectly) from the chin-strap assembly 900. The connector assembly 102 is also configured to selectively disconnect (either directly or indirectly) from the motorcycle device 904 (as needed or required).

Referring to the embodiments as depicted in FIG. 3 and FIG. 4, the chin-strap assembly 900 includes (and is not limited to) a first chin-strap portion 910 and a second chin-strap portion 912 spaced apart from the first chin-strap portion 910. The connector assembly 102 is also configured to selectively disconnect (either directly or indirectly) from the first chin-strap portion 910 and the second chin-strap portion 912.

Referring to the embodiments as depicted in FIG. 3 and FIG. 4, the connector assembly 102 includes an elongated strap assembly 104 having a first end portion 106 (also called the male end) and a second end portion 108 (also called the female end) spaced apart from the first end portion 106. The first end portion 106 is configured to connect (either directly or indirectly) with the first chin-strap portion 910 (as depicted in FIG. 1). The second end portion 108 is configured to connect (either directly or indirectly) with the second chin-strap portion 912 (as depicted in FIG. 2A).

Referring to the embodiments as depicted in FIG. 3 and FIG. 4, the first end portion 106 is configured to connect (either directly or indirectly) with the chin-strap assembly 900. The second end portion 108 is configured to connect (either directly or indirectly) with the chin-strap assembly 900 (in accordance with a general embodiment).

Referring to the embodiments as depicted in FIG. 3 and FIG. 4, the elongated strap assembly 104 includes (and is not limited to) the first end portion 106, and the second end portion 108 spaced apart from the first end portion 106. The elongated strap assembly 104 also includes a central portion 110 having opposite end portions. The first end portion 106 and the second end portion 108 extend from opposite end portions of the central portion 110.

It will be appreciated that the connector assembly 102 is configured to be utilized with different types of the motorcycle helmet 902. As well, the connector assembly 102 is configured to be compact, or easily stored, when not utilized. Some advantages of the connector assembly 102 may include (and is not limited to): (A) an aesthetically pleasing appearance, (B) ease of storage when not utilized, (C) usability for different types and/or sizes of the motorcycle helmet 902, etc.

In accordance with a preferred embodiment, any one of the elongated strap assembly 104, the first end portion 106 and the second end portion 108 includes a webbing material (a flexible webbing material) having any suitable material (such as a fabric, cloth, etc., and any equivalent thereof). The first end portion 106 and the second end portion 108 each includes a non-elastic material (such as, nylon, polyester, a cotton blend, etc., and any equivalent thereof). The central portion 110 includes an elastically resilient material (also called an elastic member), such as rubber, silicone, etc., and any equivalent thereof. The central portion 110 is preferably wider than the second end portion 108 and is also wider than the first end portion 106. The central portion 110 preferably includes an elastic material that provides shock absorbing qualities (that may be experienced during rougher riding conditions). The central portion 110 preferably includes a grip material that provides improved gripping qualities (that may be experienced during rougher riding conditions). More preferably, the central portion 110 includes an elastically resilient material in combination with a grip device 114 (including a grip material). Preferably, the grip device 114 includes a tactile silicon material placed on at least a portion of a side (or both sides) of the central portion 110. The grip device 114 does not interfere with connecting the connector assembly 102 to the motorcycle helmet 902. In accordance with a specific embodiment, the grip device 114 forms a pattern of dots, a random pattern, etc., and any equivalent thereof. Less preferably, the central portion 110 includes a grip device 114 (including a grip material) without an elastically resilient material.

Preferably, the second end portion 108 includes a buckle assembly 112. The buckle assembly 112 includes any type of buckle, such as a set of two rings or two D-shaped rings, etc., and any equivalent thereof. The buckle assembly 112 is operatively coupled (connected) to the distal end section of the second end portion 108.

It will be appreciated that the lengths of the first end portion 106, the second end portion 108 and the central portion 110 may be of any desired length (to improve the connection of the connector assembly 102 to the motorcycle device 904). It will be appreciated that the shapes of the first end portion 106, the second end portion 108 and the central portion 110 may be of any desired shape (to improve the connection of the connector assembly 102 to the motorcycle device 904).

FIG. 5A and FIG. 5B depict perspective views of an embodiment of the apparatus of FIG. 3 where the apparatus (that is, the connector assembly 102) is coupled to the motorcycle helmet 902 of FIG. 1. The motorcycle helmet 902 is depicted in an upside down position to improve the view of the connector assembly 102. It will be appreciated that the embodiment as depicted in FIG. 5B is applicable to the buckling systems positioned on opposite sides of the motorcycle helmet 902.

In accordance with a preferred embodiment, the motorcycle helmet 902 includes a chin-guard assembly 914 coupled to the chin-strap assembly 900. The chin-guard assembly 914 is configured to prevent chafing of the chin of the user wearing the chin-strap assembly 900.

FIG. 6A and FIG. 6B depict perspective views of embodiments of the apparatus of FIG. 3 where the apparatus (that is, the connector assembly 102) is coupled to the motorcycle helmet 902 and to the motorcycle device 904 of the motorcycle 906.

Referring to the embodiment as depicted in FIG. 6A, the motorcycle seat 908 is removed from the motorcycle 906 so that the motorcycle helmet 902 may be attached to the motorcycle seat 908. The connector assembly 102 (in use) wraps around (at least in part) the motorcycle seat 908, and connects the motorcycle seat 908 to the motorcycle helmet 902. Once the connector assembly 102 connects the motorcycle helmet 902 to the motorcycle seat 908, the motorcycle seat 908 is reconnected to the motorcycle 906.

Referring to the embodiment as depicted in FIG. 6B, the motorcycle device 904 includes a fairing seat cover 909 (as a substitute for the motorcycle seat 908, as depicted in FIG. 6A). A fairing element is a plastic piece on the motorcycle 906 that covers the frame and internal parts similar to the body panels on a car. An embodiment of the fairing seat cover 909 includes the fairing seat cover 909. The fairing seat cover 909 (also called a seat cover fairing) is utilized in place of the motorcycle seat 908. It will be appreciated that for the case where the motorcycle seat 908 is required, the fairing seat cover 909 is removed and the motorcycle seat 908 is installed in order to accommodate a passenger.

The connector assembly 102 may be utilized with any type of the motorcycle 906. The motorcycle 906 may include a motorcycle seat 908 in which the motorcycle seat 908 is removable (a removable seat).

Figure 7:
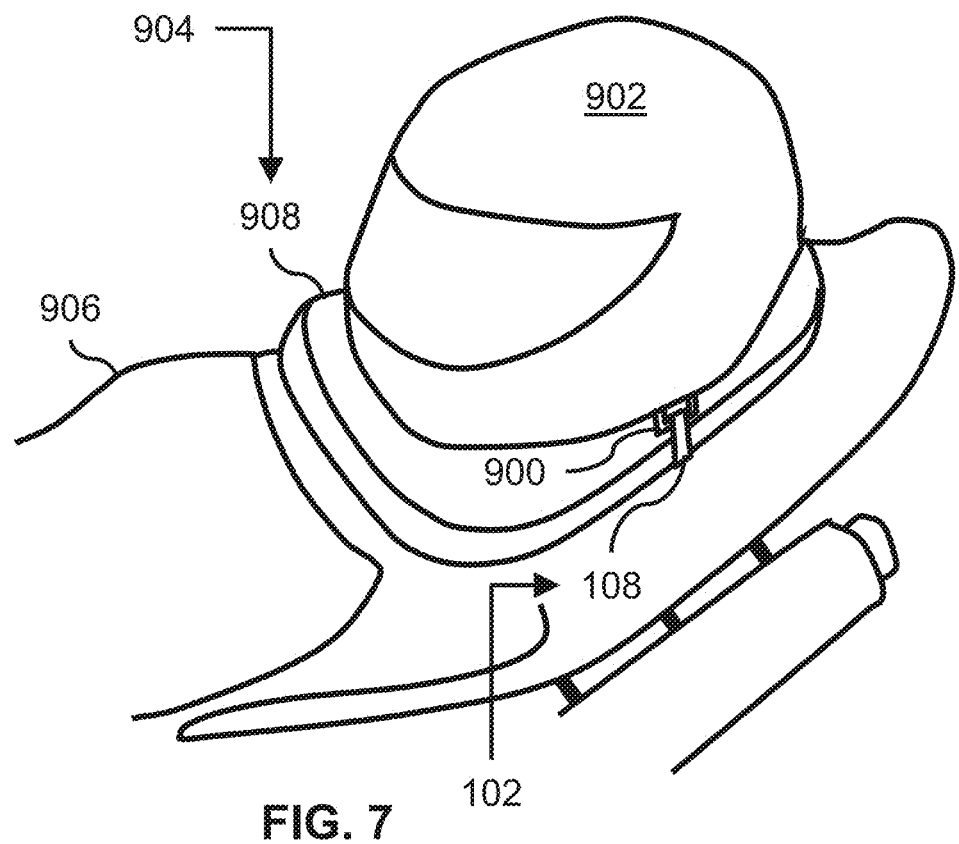
FIG. 7 (SHEET 5 of 6) depicts a perspective view of an embodiment of the apparatus of FIG. 3 that is coupled to the motorcycle helmet and is also coupled to a motorcycle device of the motorcycle.

FIG. 7 depicts a perspective view of an embodiment of the apparatus of FIG. 3 where the apparatus (that is, the connector assembly 102) is coupled to the motorcycle helmet 902 and to the motorcycle device 904 of the motorcycle 906.

Referring to the embodiments as depicted in FIG. 6A, FIG. 6B and FIG. 7, the motorcycle device 904 of the motorcycle 906 includes any one of the motorcycle seat 908 (as depicted in FIG. 6A) or the fairing seat cover 909 (as depicted in FIG. 6B). The connector assembly 102 (preferably, the elongated strap assembly 104, as depicted in FIG. 3) is configured to wrap around, at least in part, and to be securely attached to, the motorcycle seat 908.

Referring to the embodiments as depicted in FIG. 6A, FIG. 6B and FIG. 7, the motorcycle device 904 of the motorcycle 906 includes a motorcycle seat 908. The elongated strap assembly 104 is configured to wrap around, at least in part, and to be securely attached to, the motorcycle seat 908. This is done in such a way that the elongated strap assembly 104 of the motorcycle helmet 902 is securely attached relative to the motorcycle seat 908 once (A) the second end portion 108 is connected with the second chin-strap portion 912, as depicted in FIG. 5A (more specifically, the first end portion 106 is coupled or securely connected with the chin-strap connector 911 of the first chin-strap portion 910), (B) the elongated strap assembly 104 (in use) wraps around, at least in part, and is securely attached to, the motorcycle seat 908, as depicted in FIGS. 6A, and (C) the first end portion 106 is connected with the first chin-strap portion 910, as depicted in FIG. 5A (more specifically, the 112 is coupled or securely connected to the second chin-strap portion 912).

In view of the embodiments as depicted in FIG. 6A and FIG. 7, the manner in which to connect (either directly or indirectly) the motorcycle helmet 902 to the motorcycle seat 908 is as follows (and not limited to): (A) place the motorcycle helmet 902 on the motorcycle seat 908, (B) place the connector assembly 102 against the underbody of the motorcycle seat 908 with the grip device 114 (as depicted in FIG. 3) facing toward the motorcycle seat 908 so the grip device 114 may grab onto areas of the motorcycle seat 908 (the ridges or the sides thereof, etc., and it will be understood that the areas may differ depending on the size of the motorcycle seat 908 and/or the configuration of the connector assembly 102), (C) connect (either directly or indirectly) the male end of the connector assembly 102 to the buckle assembly (such as, the D-ring buckle) of the motorcycle helmet 902, (D) tighten the connector assembly 102, (E) place the motorcycle seat 908 back onto the motorcycle 906, and (F) secure the loose end of the connector assembly 102.

Figure 8:
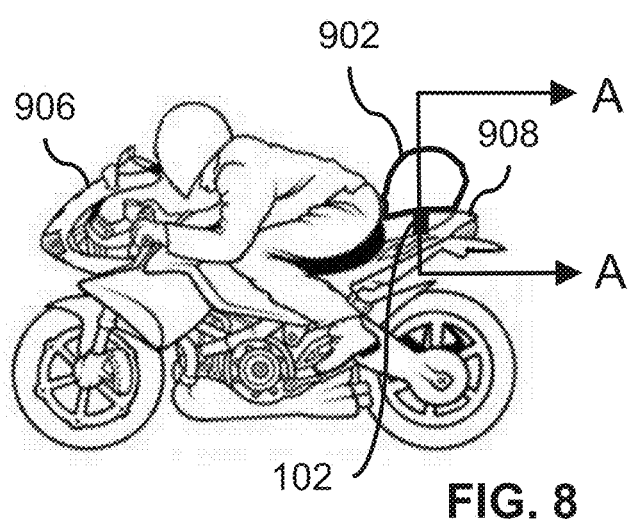
FIG. 8 (SHEET 5 of 6) depicts a side view of an embodiment of the apparatus of FIG. 3 that is coupled to the motorcycle helmet and is also coupled to a motorcycle device of the motorcycle.

FIG. 8 depicts a side view of an embodiment of the apparatus of FIG. 3 where the apparatus (that is, the connector assembly 102) is coupled to the motorcycle helmet 902 and to the motorcycle device 904 of the motorcycle 906.

Figure 9:
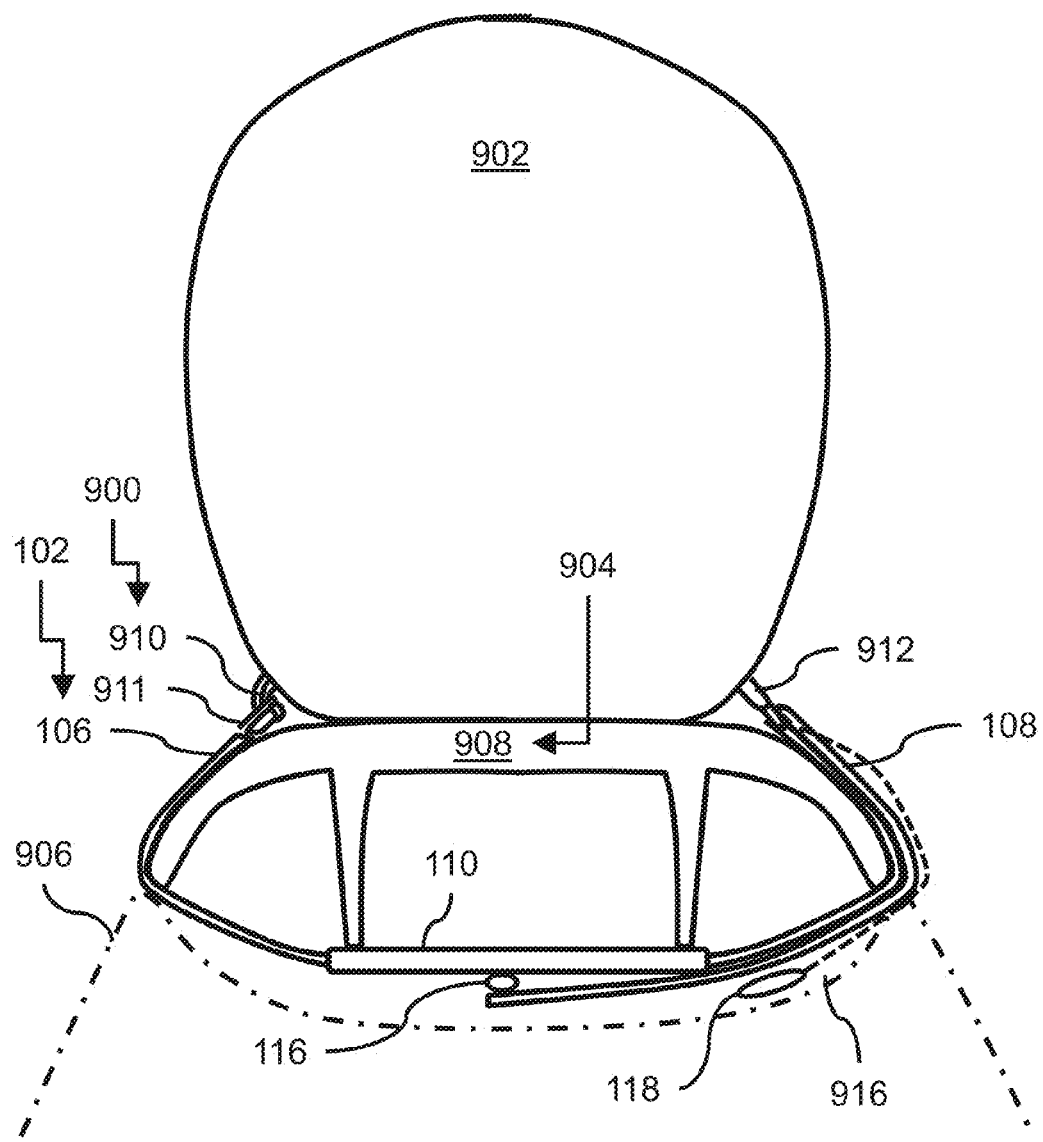
FIG. 9 (SHEET 6 of 6) depicts a cross-sectional view of an embodiment of the apparatus of FIG. 8 (taken along a cross-sectional line A-A, as depicted in FIG. 8).

FIG. 9 depicts a cross-sectional view of an embodiment of the apparatus of FIG. 8 (taken along a cross-sectional line A-A, as depicted in FIG. 8).

In accordance with an embodiment, once the connector assembly 102 is connected to the motorcycle helmet 902, any extra length of the connector assembly 102 (of the male portion of the connector assembly 102) may be tied down. For instance, a connection device 116 is configured to attach the loose end of the second end portion 108 to any one of the first end portion 106, the second end portion 108 (itself) and the central portion 110, etc. The connection device 116 may include a touch connector, such as the VELCRO (TRADEMARK) connector, a clip, etc., and any equivalent thereof. Preferably, an extra length of the connector assembly 102 is configured to be tied down by a connection device 116 once the connector assembly 102 is connected to the motorcycle helmet 902.

For the case where the motorcycle helmet 902 includes a full-face helmet, once the connector assembly 102 securely connects the motorcycle helmet 902 to the motorcycle device 904 (such as the motorcycle seat 908), the motorcycle helmet 902 may be utilized as storage (for receiving an item) because the connector assembly 102 allows for the opening and closing of the visor of the motorcycle helmet 902 once the motorcycle helmet 902 is secured to motorcycle seat 908.

In accordance with an embodiment, a cable lock device 118 is configured to securely connect (either directly or indirectly) to the chin-strap assembly 900 (to the buckle or b-rings of the chin-strap assembly 900). The cable lock device 118 is positioned in the interior of (underneath) the motorcycle seat 908 of the motorcycle 906 (once the motorcycle seat 908 is positioned onto the motorcycle 906). The cable lock device 118 is placed in the rear compartment 916 and the motorcycle seat 908 is locked into place in such a way that the motorcycle seat 908 (in use) securely covers the cable lock device 118.

The connector assembly 102 is configured to securely connect (either directly or indirectly) to respective ends of the chin-strap assembly 900. The female end of the connector assembly 102 mates to the male end of the chin strap of the motorcycle helmet 902. The male end of the connector assembly 102 mates to the female end of the chin strap of the motorcycle helmet 902.

It will be appreciated that the description identifies and describes options and variations of the apparatus, regardless of whether the description identifies the options and/or variations of the apparatus by way of explicit terms and/or non-explicit terms. Other options for the apparatus as identified in this paragraph may include any combination and/or permutation of the technical features (assemblies, components, items, devices, etc.) as identified in the detailed description, as may be required and/or desired to suit a particular technical purpose and/or technical function. It will be appreciated, that where possible, any one or more of the technical features and/or any one or more sections of the technical features of the apparatus may be combined with any other one or more of the technical features and/or any other one or more sections of the technical features of the apparatus in any combination and/or permutation. Any one or more of the technical features and/or any one or more sections of the technical features of the apparatus may stand on its own merit without having to be combined with another technical feature. It will be appreciated that persons skilled in the art would know that technical features of each embodiment may be deployed (where possible) in other embodiments even if not expressly stated as such above. It will be appreciated that persons skilled in the art would know that other options would be possible for the configuration of the components of the apparatus (if so desired) to adjust to manufacturing requirements and still remain within the scope of the invention as described in at least one or more of the claims. This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims. It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A helmet chin-strap extension apparatus, comprising:
a connector assembly being configured to selectively connect with a chin-strap assembly of a motorcycle helmet, in which the chin-strap assembly includes a first chin-strap portion having a chin-strap connector, and the chin-strap assembly also includes a second chin-strap portion that is spaced apart from the first chin-strap portion; and
the connector assembly also being configured to selectively connect with a motorcycle device of a motorcycle in such a way that the motorcycle helmet is connectable to the motorcycle device once the connector assembly connects with the chin-strap assembly and with the motorcycle device; and
the connector assembly including:
a first end portion being configured to securely connect to the chin-strap connector of the first chin-strap portion of the chin-strap assembly of the motorcycle helmet, wherein the first end portion comprises a fastener free terminal end; and
a second end portion being spaced apart from the first end portion, and a terminal end of the second end portion includes a fastener comprising two D-rings and being configured to securely connect to the second chin-strap portion of the chin-strap assembly of the motorcycle helmet; and
an elongated strap assembly comprising an elastically resilient material of a length which is able to wrap around, at least in part, and to be securely attached, to the motorcycle device in such a way that the elongated strap assembly securely attaches the motorcycle helmet to the motorcycle device once the first end portion is connected with the first chin-strap portion and once the second end portion is connected with the second chin-strap portion.

2. The helmet chin-strap extension apparatus of claim 1, wherein:
the connector assembly is also configured to selectively connect with the chin-strap assembly of the motorcycle helmet without adversely interfering with any one of the chin-strap assembly and the motorcycle helmet; and
the connector assembly is also configured to selectively connect with the motorcycle device of the motorcycle without adversely interfering with any one of the motorcycle device and the motorcycle.

3. The helmet chin-strap extension apparatus of claim 1, wherein:
the connector assembly is also configured to selectively disconnect from the chin-strap assembly; and
the connector assembly is also configured to selectively disconnect from the motorcycle device.

4. A helmet securement system comprising:
the helmet chin-strap extension apparatus of claim 1; and
the motorcycle helmet, wherein:
the first chin-strap portion of the motorcycle helmet comprises two associated D-rings; and
wherein the second chin-strap portion of the motorcycle helmet comprises an associated fastener free end.

5. A helmet securement system comprising:
the helmet chin-strap extension apparatus of claim 1; and
the motorcycle, wherein the motorcycle device of the motorcycle comprises any one of a motorcycle seat and a fairing seat cover.

6. The helmet chin-strap extension apparatus of claim 1, wherein:
an extra length of the connector assembly is configured to be tied down by a connection device once the connector assembly is connected to the motorcycle helmet.

7. The helmet chin-strap extension apparatus of claim 1, wherein:
the elongated strap assembly includes a webbing material.

8. The helmet chin-strap extension apparatus of claim 1, wherein:
the first end portion and the second end portion include a webbing material.

9. The helmet chin-strap extension apparatus of claim 1, wherein:
the first end portion and the second end portion are coupled to each other.

10. The helmet chin-strap extension apparatus of claim 1, wherein:
the chin-strap connector of the motorcycle helmet comprises two associated D-rings.

11. The helmet chin-strap extension apparatus of claim 1, wherein:
the motorcycle device of the motorcycle comprises a motorcycle seat; and
the elongated strap assembly is configured to wrap around, at least in part, and to be securely attached to the motorcycle seat.

12. The helmet chin-strap extension apparatus of claim 11, wherein:
a cable lock device is configured to securely connect to the chin-strap assembly; and
the cable lock device is positioned in an interior of the motorcycle seat of the motorcycle in such a way that the motorcycle seat, in use, securely covers the cable lock device.

13. The helmet chin-strap extension apparatus of claim 1, wherein:
   the elongated strap assembly comprises:
      a central portion having opposite end portions, and the first end portion and the second end portion extending from the opposite end portions of the central portion.

14. The helmet chin-strap extension apparatus of claim 13, wherein:
   the central portion comprises:
      a grip device.

\* \* \* \* \*